(12) United States Patent
Cooper et al.

(10) Patent No.: US 7,664,638 B2
(45) Date of Patent: *Feb. 16, 2010

(54) TRACKING TIME USING PORTABLE RECORDERS AND SPEECH RECOGNITION

(75) Inventors: James William Cooper, Wilton, CT (US); Donna Karen Byron, Rochester, NY (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/180,797

(22) Filed: Jul. 28, 2008

(65) Prior Publication Data

US 2008/0288251 A1    Nov. 20, 2008

Related U.S. Application Data

(63) Continuation of application No. 11/566,802, filed on Dec. 5, 2006, now abandoned, which is a continuation of application No. 09/785,650, filed on Feb. 16, 2001, now Pat. No. 7,171,365.

(51) Int. Cl.
   *G10L 15/26* (2006.01)
(52) U.S. Cl. .............. 704/235; 704/270; 704/231; 704/251; 704/275
(58) Field of Classification Search ............ 704/231, 704/235, 251, 270, 275
   See application file for complete search history.

(56) References Cited

U.S. PATENT DOCUMENTS

| | | | |
|---|---|---|---|
| 4,195,220 A | 3/1980 | Bristol et al. | |
| 4,984,274 A * | 1/1991 | Yahagi et al. | 704/251 |
| 5,606,497 A | 2/1997 | Cramer et al. | |
| 5,721,827 A | 2/1998 | Logan et al. | 709/217 |
| 5,991,742 A | 11/1999 | Tran | |
| 6,304,851 B1 * | 10/2001 | Kmack et al. | 705/11 |
| 6,539,359 B1 | 3/2003 | Ladd et al. | 704/275 |
| 7,171,365 B2 * | 1/2007 | Cooper et al. | 704/275 |
| 2001/0049470 A1 * | 12/2001 | Mault et al. | 600/300 |

OTHER PUBLICATIONS

Time and Billing, downloaded from www.responsivesoftware.com, on Nov. 6, 2000.

Enterprise Quality Solutions for a Low Monthly Fee, downloaded from www.elite.com, on Nov. 6, 2000.

Titrax—Time Tracker for the Palm Pilot, downloaded from www.katn.com, on Nov. 6, 2000.

* cited by examiner

*Primary Examiner*—Vijay B Chawan
(74) *Attorney, Agent, or Firm*—Wolf, Greenfield & Sacks, P.C.

(57) ABSTRACT

In general, the present invention converts speech, preferably recorded on a portable recorder, to text, analyzes the text, and determines voice commands and times when the voice commands occurred. Task names are associated with voice commands and time segments. These time segments and tasks may be packaged as time increments and stored (e.g., in a file or database) for further processing. Preferably, phrase grammar rules are used when analyzing the text, as this helps to determine voice commands. Using phrase grammar rules also allows the text to contain a variety of topics, only some of which are pertinent to tracking time.

17 Claims, 8 Drawing Sheets

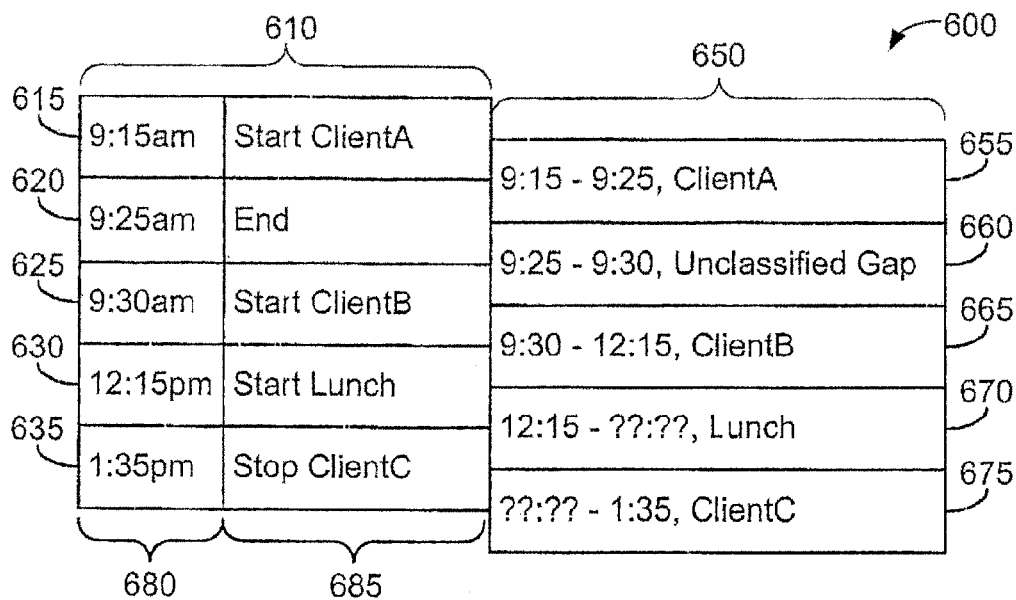

FIG. 6

```
<task> = projectA | lunch | kraft | meeting | clientA | clientB | clientC
<start-premarker> = begin | start
<start-postmarker> = starting now
<matter-number> = 910 | 920
<end-premarker> = end | quit | stop | quitting
<end-marker> = going home | stopping
<end-postmarker> = is done
<phrase> = <start-premarker> | <end-premarker> + <task>
<phrase> = <start-premarker> + <task> + <matter-number>
<phrase> = <task> + <start-postmarker> | <end-postmarker>
<phrase> = <end-premarker> | <end-marker>
```

FIG. 7

TRACKING TIME USING PORTABLE RECORDERS AND SPEECH RECOGNITION

CROSS REFERENCE TO RELATED APPLICATIONS

This application is a continuation of U.S. patent application Ser. No. 11/566,802 filed on Dec. 5, 2006 which is a continuation of U.S. patent application Ser. No. 09/785,650, filed on Feb. 16, 2001, incorporated by reference herein.

FIELD OF THE INVENTION

The present invention relates to time processing and, more particularly, relates to tracking time using portable recorders and speech recognition.

BACKGROUND OF THE INVENTION

Time is a fundamental constraint for all human endeavors, and the primary source of revenue for businesses that charge clients per unit of time. Knowing where time is spent is crucial for any productivity analysis, whether on a professional or a personal level. Manual methods for capturing time, such as journals, time cards and logs, were used by professionals for many years, but in the recent past automated tools have been developed to support this process.

The basic data item that must be captured to begin any time analysis is a time increment, which denotes a time segment during which a particular person was dedicated to a particular task. After defining task categories for which time will be collected, a person then creates time increment records, typically by using one of two methods.

In the first method, time increments are recorded after the fact based on estimates. An example of this method is a project management software package that allows its users to allocate time spent on tasks over a large time interval, perhaps a whole week. For example, consultants working on a software project use the project management software at the end of the workweek to record the tasks to which they dedicated time during the previous week. In this method, there is no direct capture of the time spent and the information generated is generally imprecise.

In the second method, time increment data is captured directly by interacting with software running on a desktop or hand-held computer platform that allows the user to start and stop a timer at the same time that the task starts and ends. This "real-time" capture is much more accurate than the previous method, because the time increment record is captured when the task is performed and an automatic clock is used to compute the interval rather than a human estimate. However, using a computer as a capture device is inconvenient for a variety of reasons that will be discussed below.

Once captured with either of the above methods, time increment records can be summarized in order to generate a variety of productivity analyses or billing reports. However, when an inaccurate capture method is used, such as recording hours at the end of the week, any analysis generated is purely an approximation.

These prior methods have the two major problems of accuracy and ease of use. Accuracy is a huge problem for any method that relies on human memory and estimates rather than supporting automated real-time capture of time increment records. Billing generated from such data is spurious at best.

Ease of use issues abound in any method requiring interaction with a computer interface in order to capture time intervals. Interacting with a computer, whether a hand-held or desktop machine, generally requires a complete interruption to the task at hand and typically takes several seconds to perhaps minutes to complete. The interruption of workflow and the amount of time required becomes a barrier to using computer-based technologies. As a result, such interfaces tend to be used for minimal data capture, i.e., only capturing billable time or only some of the actual billable time. This limits the usefulness of such products for other sorts of time analysis, for example, personal productivity analysis, time analysis for non-billable workers in support roles, and, most importantly, capturing and analyzing where non-billable time is being spent by billable workers. These ease-of-use barriers also prevent professionals from capturing small increments of time spent on billable projects, such as telephone calls made from the airport or electronic mail messages composed while on a commuter train. The revenue that would otherwise be generated from such activities is therefore lost.

Other ease-of-use problems are slightly different depending on whether a desktop or portable computer is used. Capturing time increment records with a desktop computer is not an appropriate method for those people who need a portable device, such as people whose work requires a lot of roaming around, including consultants who have meetings or work at client sites, technical support personnel who handle service calls at various locations, detectives, sales representatives, librarians, and coaches.

Using a portable computer device for capture gets past the problem of portability, but introduces its own set of problems. There are significant psychological, economic, and technology adoption barriers that limit the utility of portable or hand-held computers. Many professionals who wish to keep their interaction with computers to a minimum do not feel comfortable using such devices, and others cannot afford them. Even those people with access to portable computer devices face many ease-of-use problems. All such devices require two-handed operation and cannot be operated while walking. The entry of a time increment therefore requires the operator to completely interrupt the normal flow of his or her task.

Thus, what is needed is a better way of tracking time that limits the problems of accuracy and ease of use.

SUMMARY OF THE INVENTION

The present invention provides for better and simplified time tracking by using portable recorders and speech recognition. This increases accuracy, as more time should be tracked in real-time, and ease of use, as portable recorders are simple, inexpensive and convenient.

In general, the present invention converts speech, preferably recorded on a portable recorder, to text, analyzes the text, and determines voice commands and times when the voice commands occurred. Task names are associated with voice commands and time segments. These time segments and tasks may be packaged as time increments and stored (e.g., in a file or database) for further processing. Preferably, phrase grammar rules are used when analyzing the text, as this helps to determine voice commands. Using phrase grammar rules also allows the text to contain a variety of topics, only some of which are pertinent to tracking time.

A more complete understanding of the present invention, as well as further features and advantages of the present invention, will be obtained by reference to the following detailed description and drawings.

BRIEF DESCRIPTION OF THE DRAWINGS

FIG. 6 provides an illustration of determining time increments from voice commands and times for those commands, in accordance with one embodiment of the present invention;

FIG. 7 illustrates phrase grammar rules in accordance with one embodiment of the present invention.

DETAILED DESCRIPTION OF PREFERRED EMBODIMENTS

Basically, the present invention allows speech recorded on a portable recorder to be converted to time increments. Each time increment can contain a time segment and a task name. Optionally, other information, such as a matter number or comments may also be packaged into a time increment. Preferably, the present invention will act to supplement existing time and billing programs. For instance, a person could use the present invention to create time increments from speech and then import the time increments into a time and billing program. Thus, the present invention can fill a niche that currently remains unfilled.

Figure 1:
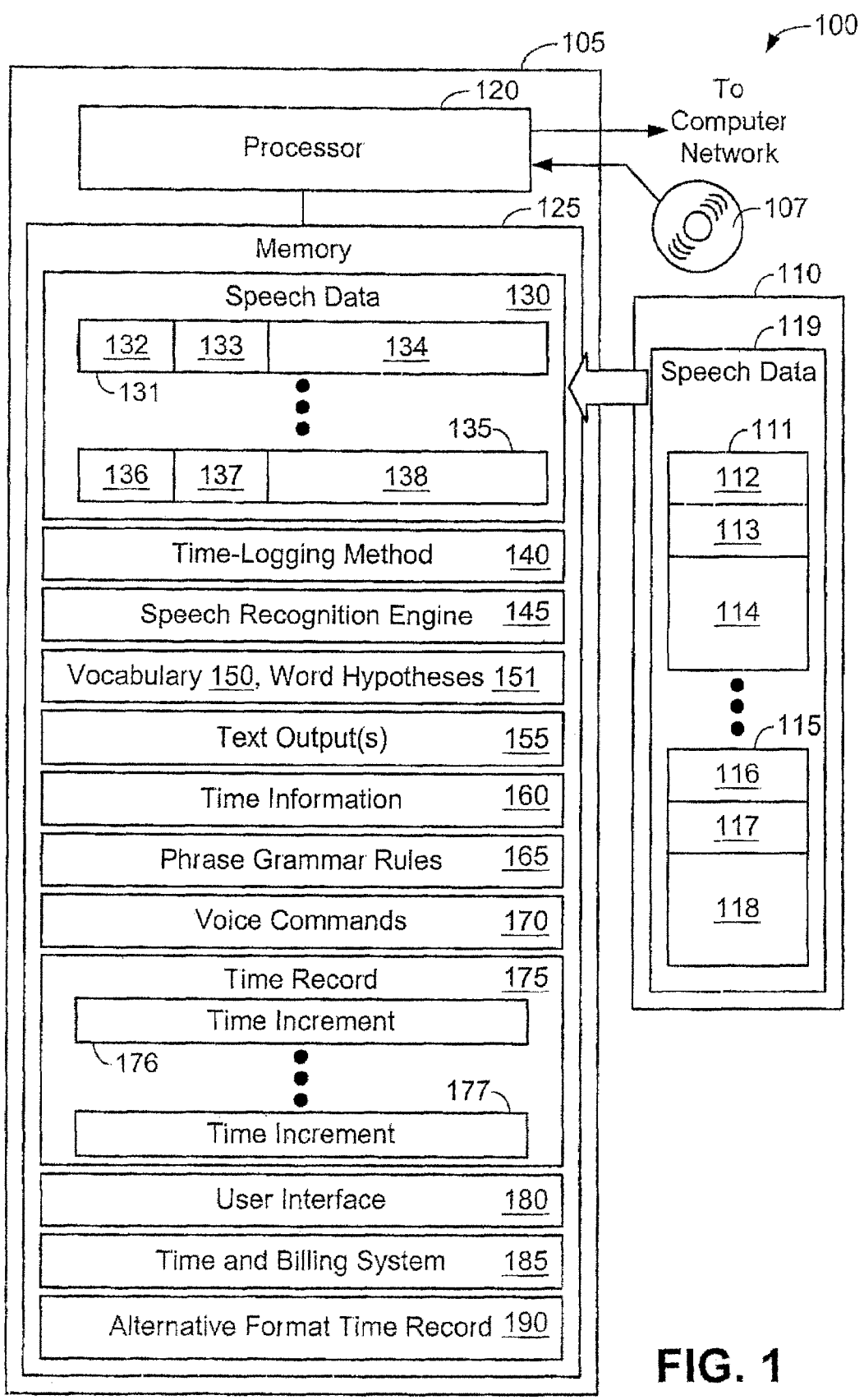
FIG. 1 is a system for tracking time using portable recorders and speech recognition, in accordance with one embodiment of the present invention.

Turning now to FIG. 1, this figure shows a block diagram of an exemplary system 100 for tracking time using portable recorders and speech recognition. System 100 comprises a portable speech recorder 110 and a computer system 105. Portable speech recorder 110 comprises speech data 119. Computer system 105 is any type of computer system, such as a personal computer, and it comprises processor 120 and memory 125. Speech data 119 comprises speech files 111 and 115. Speech file 111 comprises a time stamp 112, a date stamp 113, and speech 114. Similarly, speech file 115 comprises a time stamp 116, a date stamp 117, and speech 118. Memory 125 comprises speech data 130, a time-logging method 140, a speech recognition engine 145, vocabulary 150, word hypotheses 151, text output 155, time information 160, phrase grammar rules 165, voice commands 170, a time record 175, a user interface 180, a time billing system 185, and an alternative format time record 190. Speech data 130 comprises speech files 131 and 135. Speech file 131 comprises a time stamp 132, a date stamp 133, and speech 134. Similarly, speech file 135 comprises a time stamp 136, a date stamp 137, and speech 138. Time record 175 comprises time increments 166 and 167. Computer system 105 can receive computer-readable code means from sources such as compact disk 107.

As is known in the art, the methods and apparatus discussed herein may be distributed as an article of manufacture, such as compact disk 107, that itself comprises a computer readable medium having computer readable code means embodied thereon. The computer readable program code means is operable, in conjunction with a computer system such as computer system 105, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk.

Memory 125 will configure the processor 120 to implement the methods, steps, and functions disclosed herein. The memory 125 could be distributed or local and the processor could be distributed or singular. The memory 125 could be implemented as an electrical, magnetic or optical memory, or any combination of these or other types of storage devices. The term "memory" should be construed broadly enough to encompass any information able to be read from or written to an address in the addressable space accessed by processor 120. With this definition, information on a network is still within memory 125 because the processor 120 can retrieve the information from the network. It should be noted that if processor 120 is distributed, there could be multiple address spaces, one address space per processing unit that makes up processor 120.

Portable recorder 110 is any type of recorder that can store speech. Preferably, portable recorder 110 records a time stamp for each amount of speech that is recorded. Preferably, this time stamp indicates when the speech starts, but the time stamp could also indicate when the speech ends.

In FIG. 1, portable recorder 110 contains speech data 119. Speech data 119 contains a number of speech files, of which speech files 111 and 115 are shown. Speech data 119 could be stored on a tape or other memory device. Preferably, speech files contain time and date stamps along with speech. For instance, speech file 111 contains time stamp 112, date stamp 113 and speech 114, while speech file 115 contains time stamp 116, date stamp 117 and speech 118. The time and date stamps could be speech, vocalized by an operator of the portable recorder 110, of the time and date. Preferably, however, the time and date stamps are determined by a clock (not shown) of the portable recorder 110 and are placed onto the speech data 119 by portable recorder 110.

Speech 111 and 115 is analog or digital information of the voice of a person. Preferably, the speech 111, 115 is digital information that can be easily loaded into computer system 105. Analog speech may also be loaded into a computer system, but it is usually converted to digital speech. If speech 114 and 118 is digital speech, it could be compressed or uncompressed, although, depending on the speech recognition engine used, it may have to be decompressed to be used with a speech recognition engine.

In a preferred embodiment, the portable recorder 110 is a digital recorder such as the Olympus D1000 digital voice recorder. This recorder digitally stores speech information, and it can add date and time stamps to speech. The speech is stored in a format known as Digital Speech Standard (DSS), which provides for compression of the speech. The speech can be decompressed through a DSS program (not shown in FIG. 1) provided as part of a package with the D1000. Alternatively, this functionality could be built into time-logging method 140, to be discussed below.

A digital recorder is preferred for several reasons. First, some analog media, such as tapes, degrade fairly quickly. Moreover, even when new, tapes do not contain very good quality speech recordings. Consequently, speech recognition tends to be poor with tape recordings. Conversely, digital recorders are better at retaining a high quality of speech. This will aid in speech recognition. Another consideration is the overall quality of speech on a portable recorder. If a portable recorder is used in a quiet environment, such as an office having a door and no background noise, then even the relatively poor quality of speech recorded on a tape may be converted to text with a relatively high degree of accuracy. In general, however, a portable recorder will be used in many places where the background or ambient noise is high. The voice of the speaker in these situations will be relatively hard to determine. A digital portable recorder provides the best recording of speech under such conditions, and digital recorders can contain special circuits and software/firmware to reduce background noise. A final consideration is that a digital portable recorder can place time and date stamps on the speech data. This makes the determination of times easier because the times do not have to be converted to text, which always has a probability of error.

Portable recorder 110, in embodiments of the present invention that use digital portable recorders, can be any type of device that can digitally record speech and that can provide time stamps for the speech. For instance, a portable recorder 110 could be a digital personal assistant with a program to allow speech to be recorded and time stamped. As previously discussed, portable recorder 110 is preferably a digital voice portable recorder.

Speech data 130 is a representation of speech data 119, after speech data 119 has been loaded into computer system 105. If speech data 119 is analog speech data, the computer system 105 can digitize this data before storing it as speech data 130. If portable recorder 110 is a digital voice portable recorder, then speech data 130 will be the representation of speech data 119 that is loaded to the computer system 105 by the portable recorder 110 and any program associated with transferring the speech data 119 to speech data 130. Speech data 130 has a number of speech files 131 through 135. Speech file 131 has time stamp 132, date stamp 133 and speech 134. Preferably, the time stamp 132 and date stamp 133 are digital representations of the time and date, respectively. The time stamp 132 should correspond to time stamp 112, date stamp 133 should correspond to date stamp 113, and speech 134 should correspond to speech 114. Speech file 135 has time stamp 136, date stamp 137 and speech 138. Preferably, the time stamp 136 and date stamp 137 are digital representations of the time and date, respectively. The time stamp 136 should correspond to time stamp 116, date stamp 137 should correspond to date stamp 117, and speech 138 should correspond to speech 118.

If a digital voice portable recorder 110, such as a D11000 portable recorder made by Olympus, is used, the speech data 130 could be in a proprietary format. However, the time stamps 132, 136 and date stamps 133, 137 can still be accessed, deciphered and correlated with the appropriate speech 134, 138. Furthermore, as discussed below, the speech can still be accessed for conversion to text.

Time-logging method 140 controls the computer system 105 to convert speech in speech data 130 to time increment record 175. Optionally, time-logging method may also provide a user interface 180 (to be discussed below) and can facilitate transfer of speech data 119 into speech data 130. Time-logging method 140 can contain some, many or all of the steps necessary to perform the methods and create the apparatus or rules discussed below in reference to FIGS. 3 through 8.

In particular, the time-logging method 140 accesses or interfaces with the speech recognition engine 145 to cause the engine to convert speech in speech data 130 to text. As is known in the art, the speech recognition engine 145 uses a vocabulary 150 to determine appropriate word hypotheses 151. The speech recognition engine 145 selects the word hypothesis with the highest probability from the word hypotheses 151 to create text output 155. Text output 155 could contain multiple text files. For instance, there could be a text file corresponding to speech 134 and another text file corresponding to speech 138. Alternatively, there could be one large text file that contains all the text, perhaps with demarcations to indicate snippets of text and different start times.

Preferably, the speech recognition engine 145 also produces time information 160 that allows the text in text output 155 to be tracked relative to a starting time. As explained in more detail in reference to FIG. 5, time information 160 is beneficial to determine when a voice command was said relative to a time stamp.

Speech recognition engine 145 can be any of a number of speech recognition engines, such as the speech recognition engine that comes with VIAVOICE, which is a popular speech recognition program from IBM (International Business Machines, Incorporated, New Orchard Road, Armonk, N.Y., 10504). As discussed above and discussed in more detail below in reference to FIG. 6, it is preferred that the speech recognition engine used provide time information that relates the time that text occurs with a relative time of speech. The speech engine VIAVOICE makes this type of timing information available. A program written in the TCL language can be written to access the time information from VIAVOICE, and this information will be relative to the beginning of a speech file.

Time-logging method 140 can then compare the words in the text output 155 with phrase grammar rules 165 to determine voice commands 170. The phrase grammar rules 165 allows system 100 to specifically look for certain key words or terms. These key words and terms are the particular voice commands for which the system is trained. The voice commands are speech snippets that indicate to computer system 105 that the user wants time logging performed. For instance, the user could use the voice commands "going home," "starting clientA," or "ending clientA." These are terms that the computer system 105 should find and decipher to be able to log time. The time-logging method 140 uses the voice commands 170 to create time record 175, which contains time increments 176 through 177. Each time increment, as shown in FIG. 6 below, will preferably contain a time segment and a task name. The task name will preferably be a nickname that can be expanded, if desired, by time-logging method 140. This is discussed in more detail in reference to FIG. 8.

User interface 180 is an optional but preferred component of time-logging method 140. Generally, user interface 180 will be part of a software package (not shown) that contains time-logging method 140, and user interface 180 may be made integral to time-logging method 140. User interface 180 allows an operator to perform analyses on the time increments 176, 177 of time record 175. Also, the user interface can allow the user to enter or change data in the time record 175. The user interface 180 may also convert the time record 175 to a form suitable to importing into a time and billing system, such as time and billing system 185. In FIG. 1, an alternative format time record 190 is shown that has been converted from time record 175 into a form suitable for importation into time and billing system 185. For instance, TIMESLIPS is a time and billing program owned by Sage U.S. Holdings, Incorporated, a wholly-owned subsidiary of The Sage Group, Plc., based in Newcastle-upon-Tyne, England. TIMESLIPS contains an importation program called TSIMPORT that can import data from a source file into a TIMESLIPS database. TSIMPORT can import tab-delimited files (where fields are separated by tabs), comma-delimited files (where fields are separated by commas), custom-delimited files (where fields are separated by delimiters specified by the user), and other types of files. The user interface 180 allows a user to convert time record 175 into one or more of these types of files. Alternatively, it is possible to create time record 175 directly in one of these types of file formats such that no conversion need take place. However, the user interface 180 is still beneficial, as it allows correcting and analyzing data in time record 175 prior to importing the time records into time and billing system 185.

Thus, FIG. 1 shows a system 100 that allows a person to record voice on a portable recorder and that creates a time record from spoken commands. System 100 is convenient because all a user generally has is a portable recorder into which the user dictates. The conversion from speech data to time increments and time records can occur with any computer system having the appropriate software installed. In particular, computer system 105 could be a networked server and speech data 119 could be loaded onto the computer system 105 through a network.

In FIG. 1, it is also possible for speech recognition engine 145, vocabulary 150, and word hypotheses 151 to be part of portable recorder 110. This could occur, e.g., if the portable recorder is a personal digital assistant that can support speech processing. In this case, the text output 155 would be uploaded to the computer system 105 for processing. Also, time information 160 could be determined by having the computer system 105 query the speech recognition engine 145 (now on the portable recorder 110) for the time information 160 or having the portable recorder 110 upload the time information 160 to the computer system 105.

Figure 2:
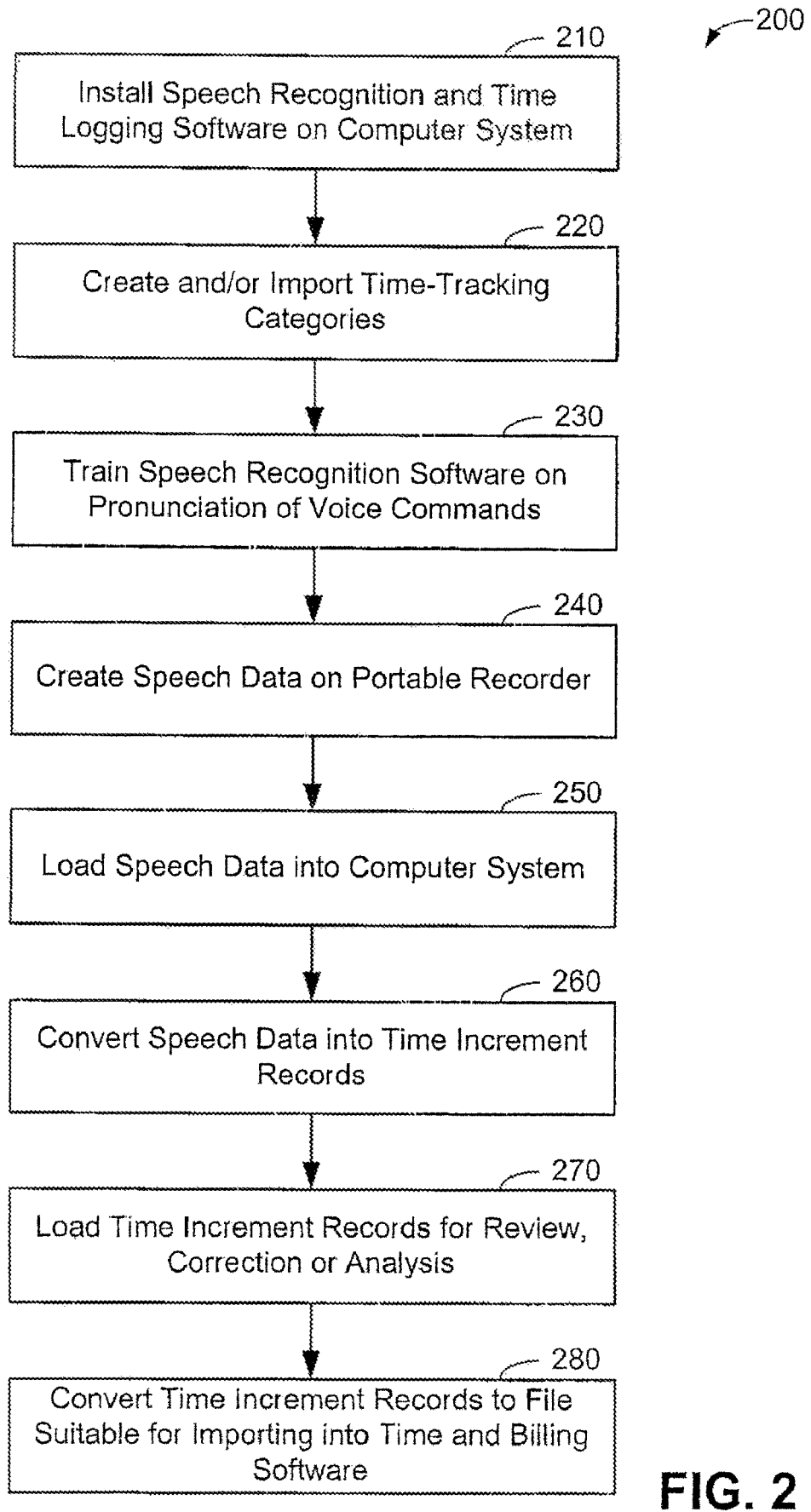
FIG. 2 is a flowchart of a method for tracking time using portable recorders and speech recognition, in accordance with one embodiment of the present invention.

Referring now to FIG. 2, this figure shows a flow chart of an overall method 200 for tracking time using portable recorders and speech recognition, in accordance with one embodiment of the present invention. Method 200 is performed whenever a computer system is being prepared to convert speech into time increments. Once the computer system is prepared to convert speech into time increments, then some steps (as discussed below) of method 200 may have already been performed.

Method 200 begins when speech recognition and time logging software are installed on a computer system (step 210). This step generally involves using an article of manufacture, such as a compact disk, to configure a system to run the speech recognition and time logging software. Step 210 is used to prepare a computer system to recognize speech and change speech into time increments. Once the computer system is prepared, step 210 generally does not need to be performed again.

In step 220, a user can create time-tracking categories by using a user interface. Such time-tracking categories could include a task name (or nickname) and other information pertinent to a task, such as billable rate, comments, and billing category or matter number. Alternatively or in addition to creation, the time-tracking categories may be imported from a currently existing time and expense tracking program. Time-tracking categories will be discussed below in reference to FIG. 8.

In step 230, the user trains the speech recognition software on the pronunciation of voice commands. The present invention can be used with many speech recognition engines, and these engines could be solely used to convert speech to text for time tracking only. If this is the case, then the speech recognition software can have a limited vocabulary. Training the speech recognition software is always beneficial, regardless of the size of the intended vocabulary, as different people will pronounce the same words differently. Alternately, the speech recognition software could be generally trained for a variety of words, unrelated to the voice commands. It is still beneficial to specifically train the speech recognition software for voice commands, as it is unlikely that the vocabulary of the speech recognition software would contain some of the relatively specific information in a voice command, such as a task name (e.g., "clientA"). Once the speech recognition system has been trained, step 230 may not have to be performed again. This is particularly true if the speech recognition system can learn new words through feedback. For instance, step 230 could be periodically run to add new voice commands or tracking categories to the system.

In step 240, the user creates speech data on a portable recorder by speaking voice commands into the portable recorder. The user may also speak additional information, such as dictated letters, grocery lists or important thoughts, onto the portable recorder. The present invention can separate the voice commands from the other speech.

In step 250, the user loads the speech data onto the computer system. This could be performed through any mechanism known to those skilled in the art, such as a wireless infrared system, serial cables, a universal serial bus connection, or a firewire connection. Once the speech is loaded into the computer system, the speech data is converted into time increment records, which can be packaged into a time record. This is discussed in more detail in FIG. 3, below.

Figure 8:
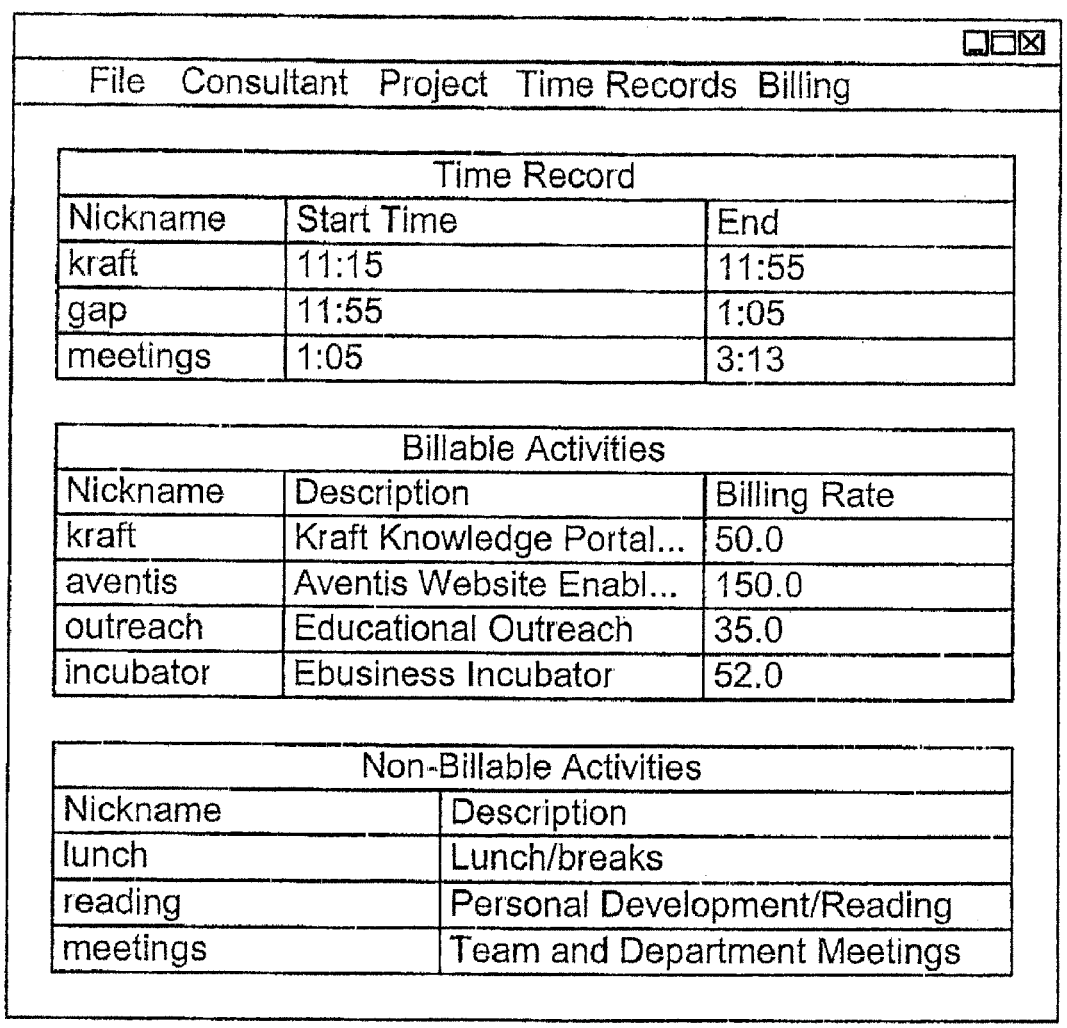
FIG. 8 shows a user interface for showing, analyzing and correcting time increments, in accordance with one embodiment of the present invention.

In step 270, the user has the option of loading the time increment records into a user interface for review, correction or analysis. An exemplary user interface is shown in FIG. 8. In step 280, the user has the additional option of converting, if necessary, the time records into a file suitable for importation into a time and billing software package. This allows the time increment records created with the present invention to be used with existing software.

Figure 3:
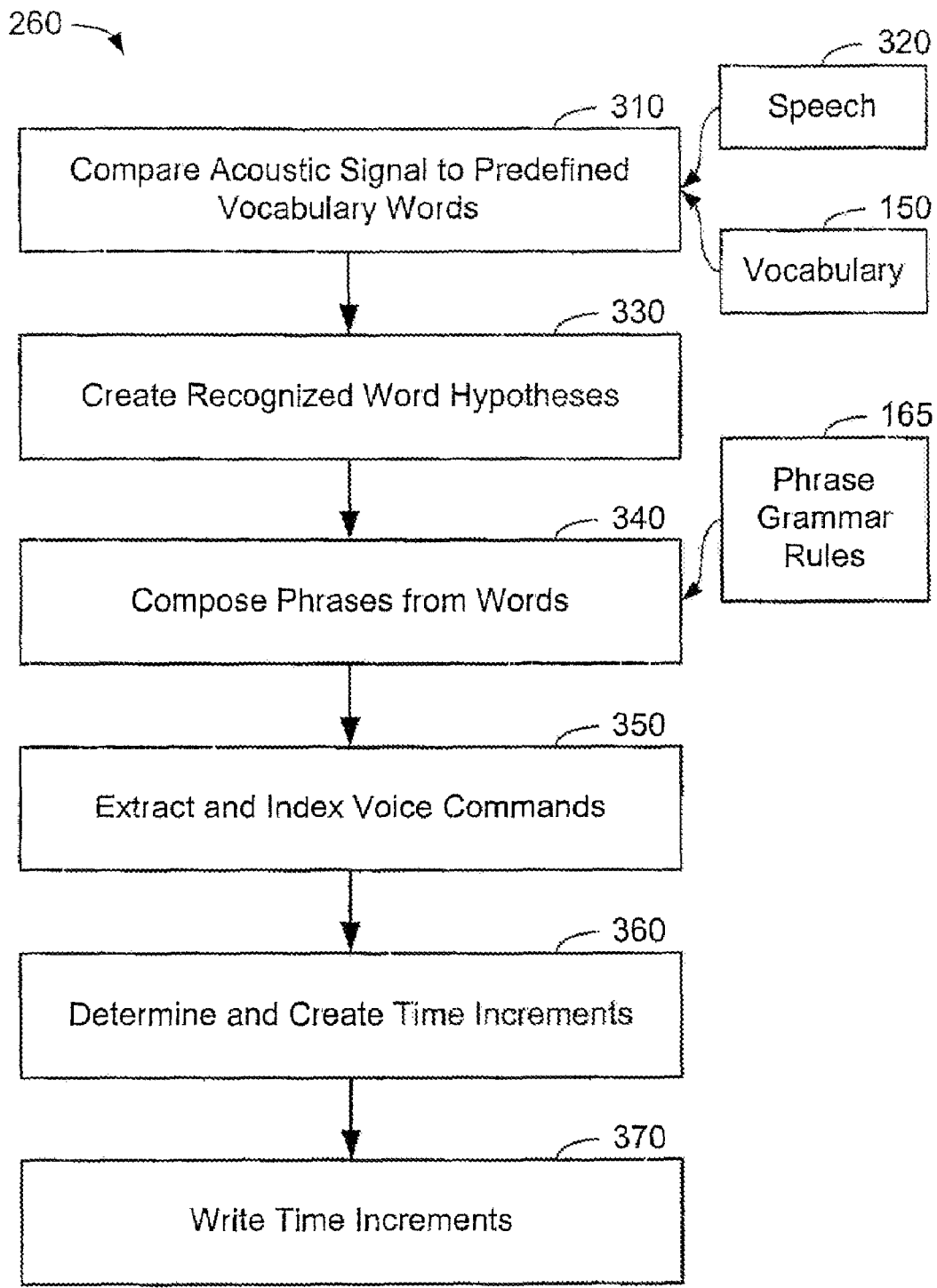
FIG. 3 is a flowchart of a method for converting speech data into time increment records, in accordance with one embodiment of the present invention.

Referring now to FIG. 3, this figure shows a flow chart of an exemplary method 260 for converting speech data into time increment records. Method 260 is performed whenever a user would like speech converted to time increment records. Generally, this occurs after the user speaks voice commands into a portable recorder for period of a day or several days. The user then loads the speech data containing the voice commands into a computer system, which then performs method 260.

Method 260 begins when the acoustic signal, which represents speech 320, is compared to predefined vocabulary words from a vocabulary such as vocabulary 150. Using a vocabulary is common in speech processing. A speech recognition engine can create recognized word hypotheses (step 330), which are essentially hypotheses, having certain probabilities, that particular words have been said. From the recognized word hypotheses, the speech recognition engine selects the most probable words. Thus, at the end of step 330, the speech recognition engine has changed speech into text.

In step 340, phrases are composed from words. Phrase grammar rules 165 are used during this step to help in determining phrases associated with voice commands. In step 350, the voice commands are extracted from the phrases and indexed. Extracting the voice commands could be simple, because the phrases should be highly representative of voice commands. However, there are times, as explained in more detail below in reference to FIG. 5, when additional processing might be needed to distinguish terms used in voice commands from the same terms used in normal speech. In other words, there could be times when the context in which a term is used will determine whether the term is or is not a voice command. It is possible to use a portable recorder only for tracking time and only for recording voice commands. In this situation, context should not be important.

The voice commands are indexed by determining the time, and also preferably the date, when the voice commands were recorded. As explained in more detail in reference to FIG. 6 below, this allows time increments to be created with time segments. In step 360, the time increments are created. If the speech is long and has many voice commands on it, the number of time increments could also be quite long. Once the time increments are created, they are written to long- or short-term memory for further processing. They may also be packaged into a time record, which can be a file having a specific, binary, or ASCII format.

Figure 4A:
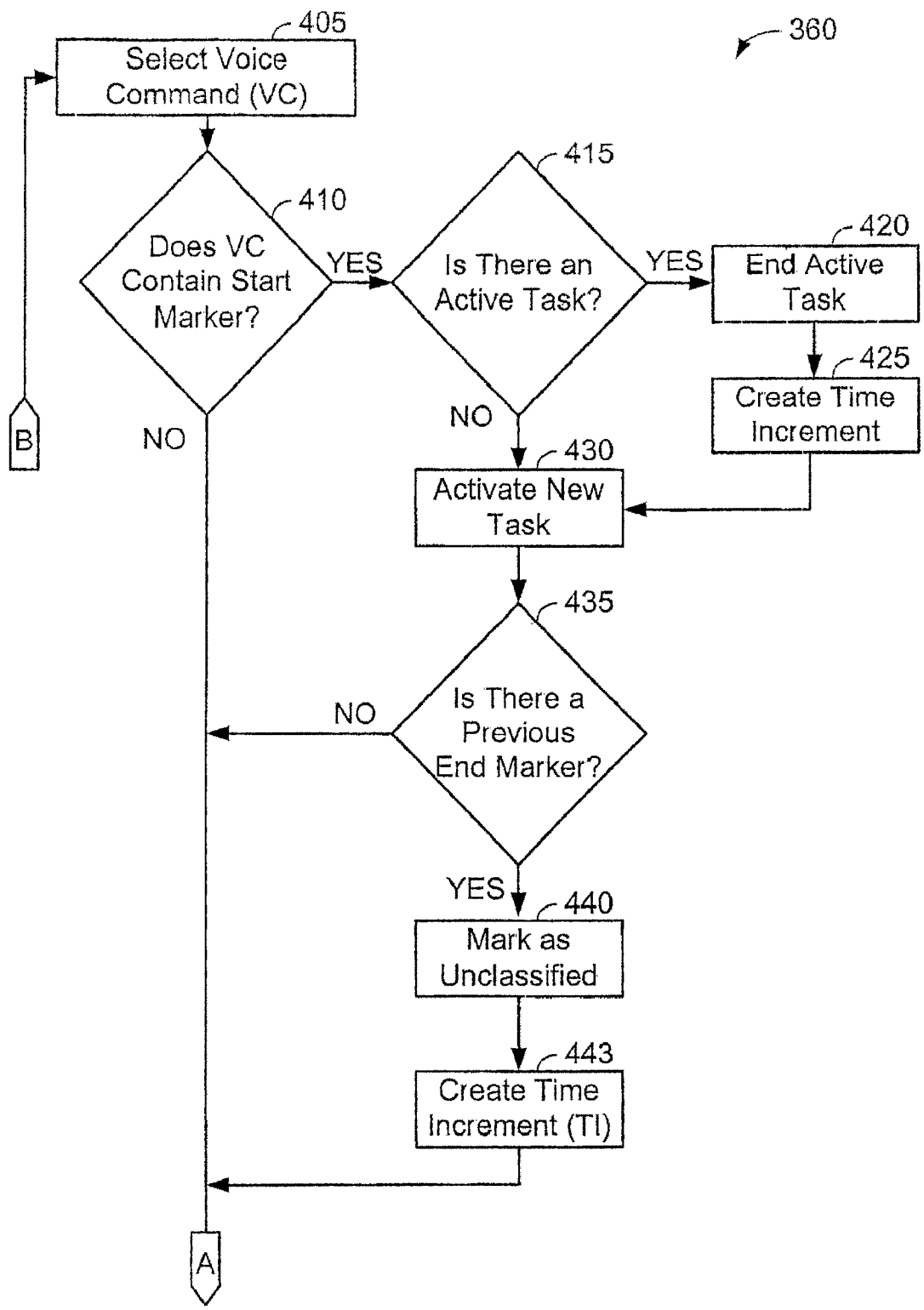
FIG. 4 is a flowchart of a method for determining and creating time increments, in accordance with one embodiment of the present invention.
Figure 4B:
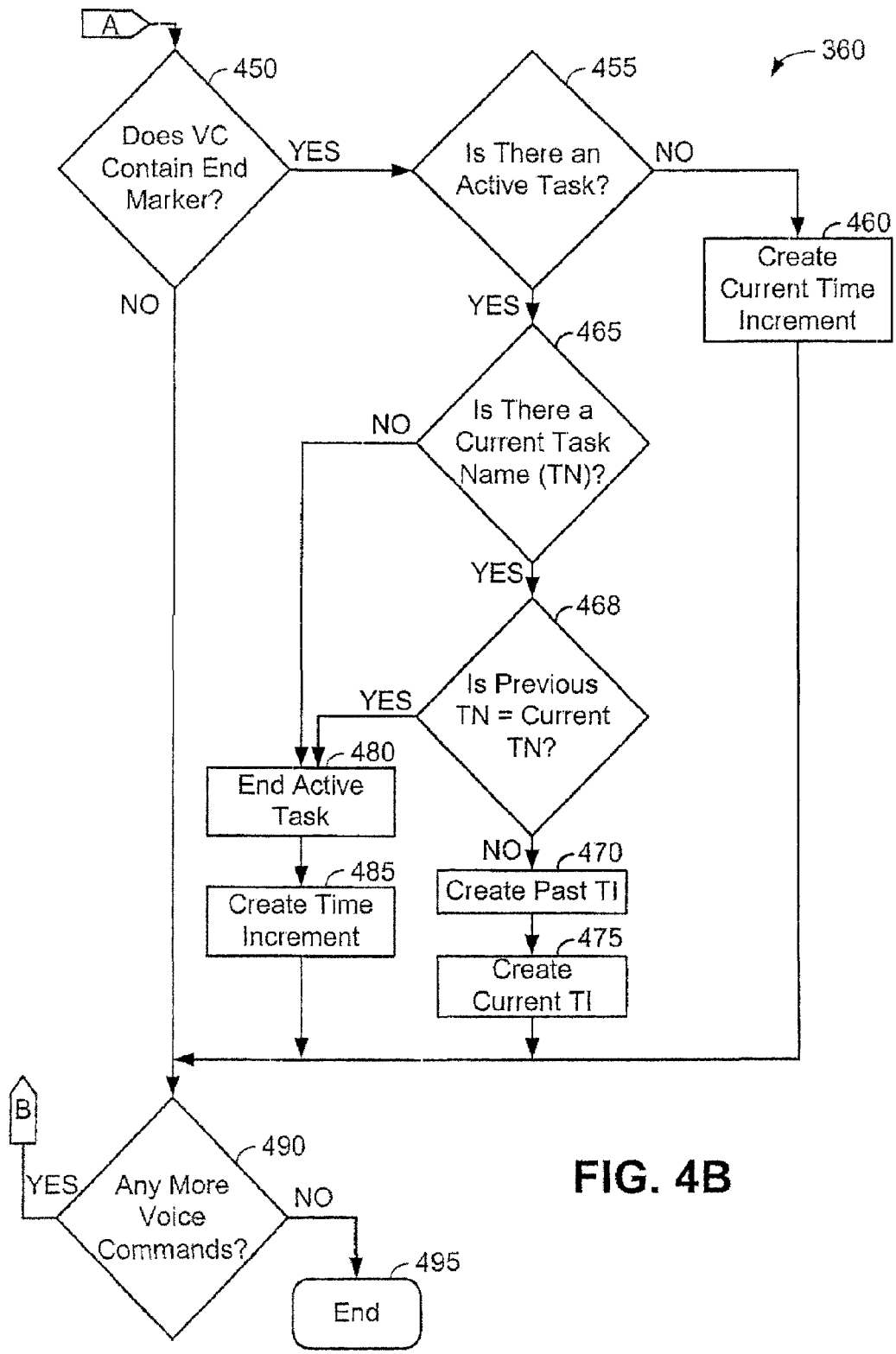

To determine and create time increments, method 360, shown in FIGS. 4A and 4B, is used. Method 360 will be discussed and then several examples will be given to aid in understanding the method. Method 360 begins when a voice command is selected. Generally, this would be a voice command at the beginning of a list of such commands. In step 410, it is determined if the voice command contains a start marker, which is a marker before or after a task name, that indicates that a task is starting. The various start and end markers are shown in FIG. 7 and discussed in more detail below in reference to that figure. As a short introduction here, start markers can occur before or after a task name or could, optionally but not preferred, be task names. For example, in the voice commands "start clientA" and "clientA starting," the words "start" and "starting" are start markers and "clientA" is a task name.

In FIG. 4, if the voice command does contain a start marker (step 410=YES), it is determined if there is an active task (step 415). By "active" it is meant that, according to the immediately preceding voice command, a task associated with the preceding voice command has been started. For instance, if the previous voice command was the statement, converted to text, "begin ClientA," then the task associated with the task name ClientA is currently being performed. If there is an active task (step 415=YES), the active task is ended (step 490) and a time increment for the task is created (step 425). If there is no active task (step 415=NO) or step 425 has been performed, a new task is activated (step 430). This means that a task name and start time are preferably kept such that it is known that this task is active.

When activating the new task, if there is no task name in the selected voice command, a place holder name such as "unknown" could be used. For example, if the current voice command is "start" but there is no task name, then "unknown" might be used. This could occur, for instance, in cases where the task name is converted to different text or is unintelligible. If the next voice command is "end ClientA," then the place holder name could be changed to ClientA.

It should be noted that steps 420, 425 and 430 allow starting voice commands to end the previously active task. Consider the following situation: the voice command "start clientA" followed by any one of the subsequent voice commands "start clientB," "going to lunch," "going to meeting," or "going home." The task "clientA" will be an active task when the subsequent voice command is issued. The subsequent voice command actually starts a different task. The present invention will stop the task of "clientA" and start the subsequent task ("clientB," lunch, meeting, or home/end of day). Thus, an ending voice command is not required to end the currently active task. This is in marked contrast to current time tracking systems, which do not and cannot assume that one task is ending if another task has begun. Thus, the present invention can "intelligently" determine when a currently active task should end.

In step 435, it is determined if there is a previous end marker (step 435). If there is no previous end marker (step 435=NO), the method continues in step 450. If there is a previous end marker (step 435=YES), the time from the previous voice command to the time of the current voice command are marked as unclassified (step 440) and a time increment for the unclassified time is created (step 443). The method then continues in step 450.

In step 450, it is determined if the voice command contains an end marker. End markers indicate that a task has ended and may precede a task name, follow a task name, or be stated by themselves. If the voice command does not contain an end marker, the method continues at step 490. If the voice command does contain an end marker (step 450=YES), it is determined if there is an active task (step 455). If there is no active task (step 460=NO), then a current time increment is created (step 463) with a time segment that indicates that the previous time is unknown but that the current time is the time of the current voice command. The time increment will be marked either as "unknown" or with the current task name from the voice command. These steps help if, for instance, two end commands are spoken in a row. For example, if at 10:00 "end clientA" is spoken, and at 11:00 "end" is spoken, the time increment could indicate "??:??-11:00, Unknown." Alternatively, the "??:??" could be replaced by "10:00," which is the earliest time it could be.

If there is an active task (step 455=YES), it is determined, in step 465, if there is a current task name. If there is a current task name, it is determined if the current and the previous task names are the same (step 468). This tests for the condition where, e.g., "start clientA" occurs right before "end clientB." To attempt to remedy this situation, the past time increment is created (step 470) and the current time increment is created (step 475). In the previous example, if "start clientA" was said at 10:00 and "end clientB" was said at 11:00, these time increments could look like the following: "10:00-??:??, ClientA" and "??:??-11:00, ClientB," respectively.

If the previous task name is equivalent to the current task name (step 468=YES), the active task is ended (step 480) and a time increment created for the active task (step 485). The method continues in step 490, which can also be reached if the voice command does not contain an end marker (step 450=NO). If there are more voice commands to be examined (step 490=YES), the method begins again in step 405. If there are no more voice commands to be examined, the method ends in step 495.

Now that method 360 has been described, an example will be given and discussed using the method. In a preferred embodiment, the portable recorder is a digital voice recorder that contains time stamps along with speech. The content of the speech for this example will be "start clientA . . . end . . . start clientB . . . start lunch . . . stop clientC," where the ellipses indicate additional spoken words, pauses or stops. After this speech is converted to text, the present invention, using grammar rules such as those discussed below in reference to FIG.

7, will determine that the voice commands are "start clientA," "end," "start clientB," "start lunch," and "stop clientC."

The present invention can then examine these voice commands through method 360. For the first voice command, "start clientA," there would be a start marker (step 410=YES) of "start," there is no active task (step 415), so a new task is activated (step 430) with the task name of clientA. There are no previous end marker (step 435=NO), the voice command does not contain an end marker (step 450=NO), but there are voice commands (step 490=YES), so another voice command is selected (step 405). This voice command is "end." This is an end marker, so step 410=NO and step 450=YES. There is an active task (step 455=YES), and there is no current task name in the voice command (step 465=NO). The active task is ended (step 480) and the time increment for the current task is created (step 485).

The method starts again on step 405. The selected voice command is "start clientB." This voice command contains a start marker (step 410=YES), but there is no active task (step 415=NO). A new task is activated for clientB (step 430) and it is determined that there is a previous end marker (step 435=Yes). The time from when the previous voice command was recorded to the time of the current voice command is marked as unclassified (step 440) and a time increment is created (step 440) for the unclassified time.

Steps 450, 490 and 405 are performed. The next voice command is selected (step 405) and is the "start lunch" voice command. There is an active task (the task of clientB) in step 415, so the active task is ended (step 420) and a time increment created (step 425) for clientB. A new task is activated (step 430) for the task of "lunch," and there is no previous end marker (step 435=NO), so steps 450, 490 and 405 are performed. In step 405, the last voice command, "stop clientC," is selected. This voice command contains an end marker, so step 450=YES. There is an active task (step 455=YES), as the task of "lunch" is still active. There is a current task name (step 465=YES), but the previous task name does not match the current task tame (step 468=NO). A past time increment is created (step 470) for the task of "lunch," and a current time increment is created for the task of "clientC" (step 475). There are no more voice commands, so the method ends in step 495.

Method 360 thus attempts to provide time increments for the maximum number of voice commands. Additional steps may be added or current steps modified, by those skilled in the art, to ensure that unusual combinations of voice commands will be captured correctly by method 360.

Figure 5:
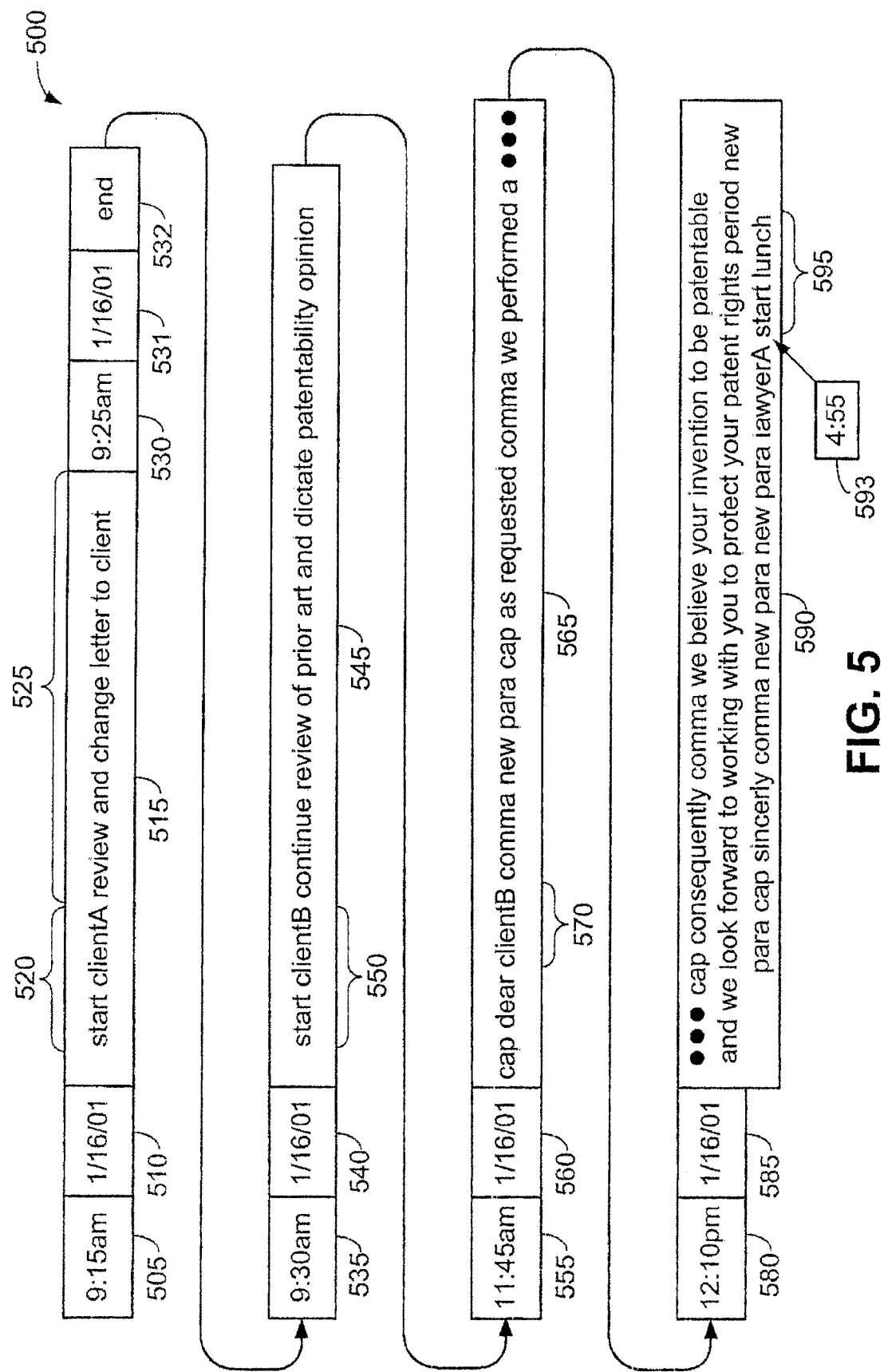
FIG. 5 illustrates a portion of speech data.

Referring now to FIG. 5, this figure shows a representation of speech data 500. Speech data 500, in this example, comes from a digital voice recorder that records time and date stamps. The digital voice recorder in this example is being used to track time and as a dictation recorder.

Speech data 500 comprises time stamps 505, 530, 535, 555, and 580, date stamps 510, 531, 540, 560, 585, and speech 515, 532, 545, 565, and 590. When the digital voice recorder records speech data 500, it places time and date stamps whenever the recorder is started (which can include returning from a pause). For example, the person using this recorder pressed the "record" button and spoke the words "start clientA review and change letter to client." The recorder created the time 505 and date 510 stamps. Speech 515 contains a voice command 520 and notes 525 concerning the voice command 520. Speech 532 simply contains a voice command. Speech 545 contains a voice command 550 and a note about the voice command 550. Speech 565 contains the beginning of a dictated patentability opinion letter, while speech 590 contains the end of the dictated letter and a voice command 595.

When the present invention examines this speech data 500, the present invention will determine that speech 520, 550 and 595 are voice commands but that speech 570 is not. The present invention can determine this because the phrase grammar rules, as shown and discussed below with reference to FIG. 7 do not allow a task name by itself to start or stop a task. In speech 570, there are no other start or end markers around the word "clientB," and the present invention, based on phrase grammar rules, will determine that there is no voice command in speech 590.

Voice command 520 is associated with time stamp 505, or 9:15. In other words, the voice command 520 is assumed to have been said at about this time. Similarly, voice commands 532 and 550 are also assumed to have been said at about the times of time stamps 530 (9:25) and 535 (9:30), respectively. However, voice command 595 is said quite a bit of time after time stamp 580. To determine the time that voice command 595 was said, the present invention preferably accesses time information given by the speech recognition system. The time information should relate the text with a relative time after the speech has started. In general, speech 525, 532, 545, 565 and 590 can be considered separate files. A speech recognition engine should treat each separately and should separately track time for each. The time information should start for each at the beginning of the speech. For instance, relative time 593, determined by accessing the time provided by the speech recognition engine, indicates that 4 minutes and 55 seconds have elapsed since the beginning of speech 590. This relative time 593 can be added to the time in time stamp 580 to determine that the voice command 595 was said at about 12:15. Thus, the relative time information from a speech recognition engine can be helpful to determine when a voice command was issued.

It should be noted that this type of relative time information, produced by a speech recognition engine, should not be needed if a digital portable recorder is used solely to track time, if the person stops and starts a digital recorder immediately prior to issuing a voice command, or if an analog portable recorder is used and the person states the time along with a voice command.

Referring now to FIG. 6, this figure shows a table 600 that contains voice command information 610 and time increment information 650. Voice command information 610 is compiled after the speech has been converted to text and phrase grammar rules have been used to determine voice commands. The content of the speech, which has been changed into voice command information, in FIG. 6 is most of the speech shown in FIG. 5. From the voice commands, the time increment information can be determined. For instance, method 360 of FIG. 4 could be used to determine the time increment information 650.

In FIG. 6, voice command information 610 comprises voice command entries 615, 620, 625, 630, and 635. Time increment information 650 comprises time increments 655, 660, 665, 670, and 675. Each voice command entry comprises a time 680 associated with a voice command 685. The present invention creates time increment information 650 from the voice command information 610. Many of the entries in the example in FIG. 6 have also been discussed previously in reference to FIG. 4.

Time increment 655 is created from voice command entries 615 and 620. Time increment 660 is created from voice command entries 625 and 620. Time increment 665 is created from voice command entries 630 and 625. It is assumed that starting a current task prior to ending a previous task will stop the previous task and start the current task. If desired, it is possible that each task must be stopped prior to starting another task. In this situation, the voice command entry 630 could cause an error time increment. Time increments 670 and 675 are created from voice command entries 630 and 635. There is an error because there is no indication as to when lunch stopped and when the work for clientC began.

It should be noted that, if desired, silence (or the lack of an ending voice command) may be an indication that the current task is to end. For instance, if quitting time is 6 pm, the system could record the ending time as 6 pm even though no ending voice command was given. Alternatively, the system could indicate 6 pm as the ending time but indicate a possible error in the time increment. Such an error could be indicated as "6:00?" or "6:00!".

Referring now to FIG. 7, this figure shows a set of phrase grammar rules 165 that are used to determine voice commands from a text file. The rules shown in FIG. 7 are only examples of possible phrase grammar rules, and the actual set of rules used in an embodiment will probably include more rules than those shown, could include additional lexical terms, and could be differently written. There are a variety of ways of writing rules suitable for use with the present invention, and the rules included herein are merely examples of one way to do this. Phrase grammar rules 165 contain indications of tasks and their associated task names in the <task> category. The symbol "|" between each task name (and as used throughout FIG. 7) indicates "or," while "+" indicates "and." The rules 165 contain start markers, which indicate that a task is beginning. The start markers can be said before a task name, which is the <start-premarker>, or said after a task name, which is the <start-postmarker>. The rules 165 also contain end markers, which indicate that a task is ending. The end markers can be said before a task name, which is the <end-premarker>, said after a task name, which is the <end-postmarker>, or said alone, which is the <end-marker>. Optionally, the present invention can also use matter numbers, which are task-specific numbers that track more specific tasks. For instance, a matter number of 900 might indicate patentability opinions, which are tasks more specific than just general patent tasks. In the example of FIG. 7, approved matter numbers are in the <matter-number> category. Additionally, client-specific tasks may also be tracked. These tasks may be tracked by number or words. A client-specific task might be, e.g., "clientA 9765," where "9765" indicates a different task than, say, "9764." The task "9765" might correspond to "trademark application," while "9764" might correspond to "patent litigation."

Phrases are series of words that indicate that a task has started or ended. For instance, one of the allowed phrases is indicated in <phrase> as "<start-premarker> or <end-premarker> and <task>." Using this phrase definition, approved phrases are "start projectA," "end lunch" or "quitting meeting." Then the system can determine whether the phrase is starting or stopping the current task by determining if a start or end, respectively, marker is used.

The phrases in phrase grammar rules 165 are thus specific to the types of words used to start and end tasks. The list of phrase grammar rules 165 may be expanded at any time, and any new words added to the rules 165 may be trained in a speech recognition engine to provide for higher possibility that the new words will be correctly converted to speech.

It should be noted that a voice command is a spoken series of words that are intended to end or start tasks. The voice command may also be a text representation of such spoken words. The phrases in phrase grammar rules 165 are, on the other hand, rules that define what words can be put together (and in what order) to create valid voice commands, but the phrase grammar rules are not the voice commands themselves.

Preferably, an initial set of predefined phrase grammar rules will be included with the system, and interface 180 will allow the user to modify, delete, or add new rules.

Turning now to FIG. 8, this figure shows an exemplary user interface 800 that allows a person to view, analyze, modify, export, create, and remove time increments. The user interface 800 can be created through a number of graphical user interfaces, as is known in the art. User interface 800 has a file menu (File, Consultant, Project, Time Records, Billing), a time record, billable activities, and non-billable activities. The time record shows the current time increments that are being analyzed or viewed. The "nickname" is a task name that indicates a task. The billable activities section shows a nickname, description and billing rate. The non-billable activities section shows a nickname and a description. The nickname, description and billing rate (or non-billing status) can be used to analyze the time increment data and/or could be output to a file for subsequent loading into time and billing software such as TIMESLIPS. The description can be further improved to add additional information. For instance, a nickname of "kraft900" could have a description of Kraft, matter 900, patentability opinion. This additional data could be output to a file for further processing by time and billing software. A user can freely add and change the interface, and can use the interface to output files suitable for loading into a time and billing program. For example, under "time records," an option might be "export," which allows the further selection of different types of exportable file formats and which data, if any, from billable and non-billable activities sections will supplement or replace the time increments.

Thus, what has been shown is a time tracking system that can convert speech on portable recorders to time increments that can then be analyzed, changed or viewed. The time tracking system can create an output file having time increments that allow a user to import the file into a separate time and expense billing program.

It is to be understood that the embodiments and variations shown and described herein are merely illustrative of the principles of this invention and that various modifications may be implemented by those skilled in the art without departing from the scope and spirit of the invention. For instance, notes (such as note 525 in FIG. 5) could be added to time increments by the present invention, through expanded phrase grammar rules.

What is claimed is:

1. A method, performed on a computer system, for tracking time using speech recognition, the method comprising the acts of:

accessing speech data;

recognizing at least two voice commands from the speech data, each voice command occurring at a different time;

determining a first time, indicative of a first time of day, associated with a speaking of a first of the voice commands, wherein said first voice command identifies a start of a time interval;

determining a second time, indicative of a second time of day, associated with a speaking of a second of the voice commands, wherein said second voice command identifies an end of said time interval; and storing data identifying said time interval and data identifying one or more of said first voice command and second voice command, wherein the speech data comprises a time stamp that indicates a third time of day; and the act of determining a first time comprises:
  determining an offset time that is a time difference between the time stamp and a time when the first voice command is spoken; and
  determining the first time through reference to the time stamp and the offset time.

2. The method of claim 1, wherein:
the act of determining a second time comprises:
  determining a second offset time between the time stamp and a time when the second voice command is spoken; and
  determining the second time through reference to the time stamp and the second offset time.

3. The method of claim 2, wherein:
the act of determining the first time through reference to the time stamp and the offset time comprises the act of adding the offset time to the time stamp to determine the first time; and
the act of determining the second time through reference to the time stamp and the second offset time comprises the act of adding the second offset time to the time stamp to determine the second time.

4. The method of claim 1, wherein:
the speech data comprises first and second time stamps;
the act of determining a first time comprises:
  determining a first offset time between the first time stamp and a time when the first voice command is spoken; and
  determining the first time through reference to the first time stamp and the first offset time; and
the act of determining a second time comprises:
  determining a second offset time between the second time stamp and a time when the second voice command is spoken; and
  determining the second time through reference to the second time stamp and the second offset time.

5. The method of claim 1, further comprising the acts of:
recording speech onto a portable recorder; and
loading the speech data from the portable recorder to the computer system, the speech data comprising the speech and a plurality of time stamps.

6. The method of claim 1, further comprising the act of:
determining at least one task name from the text of the at least two voice commands.

7. The method of claim 6, wherein the act of determining at least one task name comprises finding the at least one task name in the text.

8. The method of claim 6, wherein the act of determining at least one task name comprises associating at least one task name to said time interval between the first and second times, wherein the at least one task name is not in the text.

9. The method of claim 6, wherein the at least one task name comprises two task names, a first task name associated with a first of the voice commands and a second task name associated with a second of the voice commands, wherein the first and second voice commands occur adjacent to each other in time, wherein the first and second task name are different, and wherein the second voice command is assumed to end a first task corresponding to the first task name and start a second task corresponding to the second task name.

10. The method of claim 6, further comprising the act of packaging the first time, second time, and one task name from the at least one task name into a time increment.

11. The method of claim 6, wherein the at least two voice commands comprises a plurality of voice commands, wherein the at least one task name comprises a plurality of task names, and wherein the method further comprises the acts of:
  determining an additional plurality of voice command times, each of the voice command times associated with one of the plurality of additional voice command times;
  converting each of the plurality of voice commands to text;
  determining a plurality of task names from the text;
  associating a task name with two of the first time, second time, or additional plurality of voice command times;
  creating a plurality of time increments, each time increment comprising two times of the first time, second time, or additional plurality of voice command times and a task name; and
  storing the plurality of time increments.

12. The method of claim 6, further comprising the act of determining text versions of the at least two voice commands by comparing words in the text with phrase grammar rules.

13. A system for tracking time using speech recognition, the system comprising:
  a computer system comprising:
    a memory that stores computer-readable code; and
    a processor operatively coupled to the memory, the processor configured to implement the computer-readable code, the computer-readable code configured to:
      access speech data;
      recognize at least two voice commands from the speech data, each voice command occurring at a different time;
      determine a first time, indicative of a first time of day, associated with a speaking of a first of the voice commands, wherein said first voice command identifies a start of a time interval;
      determine a second time, indicative of a second time of day, associated with a speaking of a second of the voice commands, wherein said second voice command identifies an end of a time interval;
      convert each of the at least two voice commands to text;
      determine text versions of the at least two voice commands by comparing words in the text with phase grammar rules; and
      storing data identifying said time interval and data identifying one or more of said first voice command and second voice command, wherein
      the speech data comprises a time stamp that indicates a third time of day; and
      the act of determining a first time comprises:
        determining an offset time that is a time difference between the time stamp and a time when the first voice command is spoken; and
        determining the first time through reference to the time stamp and the offset time.

14. The system of claim 13, wherein the speech data comprises a time stamp, and wherein the computer-readable code is further configured to:
  when determining a second time:
    determining a second offset time between the time stamp and a time when the second voice command is spoken; and
    determining the second time through reference to the time stamp and the second offset time.

15. The system of claim 13, wherein the computer-readable code is further configured to:
  store one or more time increments comprised of the first time, the second time, and at least one text version of the at least two voice commands; and
  place the time increments into a file having a format suitable for importing into a time and billing program.

16. The system of claim 13, wherein the system further comprises a digital personal recorder and wherein the computer-readable code is further configured to receive the speech data from the digital personal recorder.

17. An article of manufacture comprising:
- a computer readable medium having computer readable code means embodied thereon, the computer readable program code means comprising:
- an act to access speech data;
- an act to recognize at least two voice commands from the speech data, each voice command occurring at a different time;
- an act to determine a first time, indicative of a first time of day, associated with a speaking of a first of the voice commands, wherein said first voice command identifies a start of a time interval;
- an act to determine a second time, indicative of a second time of day, associated with a speaking of a second of the voice commands, wherein said second voice command identifies an end of a time interval;
- an act to convert each of the at least two voice commands to text;
- an act to determine text versions of the at least two voice commands by comparing words in the text with phrase grammar rules; and
- storing data identifying said time interval and data identifying one or more of said first voice command and second voice command, wherein
- the speech data comprises a time stamp that indicates a third time of day; and
- the act of determining a first time comprises:
  - determining an offset time that is a time difference between the time stamp and a time when the first voice command is spoken; and
  - determining the first time through reference to the time stamp and the offset time.

* * * * *

UNITED STATES PATENT AND TRADEMARK OFFICE
CERTIFICATE OF CORRECTION

PATENT NO.         : 7,664,638 B2                                    Page 1 of 1
APPLICATION NO.    : 12/180797
DATED              : February 16, 2010
INVENTOR(S)        : James W. Cooper et al.

It is certified that error appears in the above-identified patent and that said Letters Patent is hereby corrected as shown below:

At column 16, claim 13, line 39, "phase" should read --phrase--.

Signed and Sealed this

Sixth Day of April, 2010

David J. Kappos
*Director of the United States Patent and Trademark Office*